US012499937B2

(12) United States Patent
Kellam

(10) Patent No.: US 12,499,937 B2
(45) Date of Patent: Dec. 16, 2025

(54) FLASH MEMORY DEVICE WITH PHOTON ASSISTED PROGRAMMING

(71) Applicant: Rambus Inc., San Jose, CA (US)

(72) Inventor: Mark D. Kellam, Siler City, NC (US)

(73) Assignee: Rambus Inc., San Jose, CA (US)

( * ) Notice: Subject to any disclaimer, the term of this patent is extended or adjusted under 35 U.S.C. 154(b) by 57 days.

(21) Appl. No.: 18/031,487

(22) PCT Filed: Oct. 5, 2021

(86) PCT No.: PCT/US2021/053590

§ 371 (c)(1),
(2) Date: Apr. 12, 2023

(87) PCT Pub. No.: WO2022/086703

PCT Pub. Date: Apr. 28, 2022

(65) Prior Publication Data

US 2023/0410898 A1 Dec. 21, 2023

Related U.S. Application Data

(60) Provisional application No. 63/093,632, filed on Oct. 19, 2020.

(51) Int. Cl.

| | |
|---|---|
| ***G11C 11/42*** | (2006.01) |
| ***G11C 13/04*** | (2006.01) |
| ***G11C 16/10*** | (2006.01) |
| ***G11C 16/12*** | (2006.01) |

(52) U.S. Cl.

CPC .............. *G11C 11/42* (2013.01); *G11C 13/04* (2013.01); *G11C 16/102* (2013.01); *G11C 16/12* (2013.01)

(58) Field of Classification Search

CPC ....... G11C 11/42; G11C 16/102; G11C 16/12; G11C 16/14; G11C 13/04; G11C 16/10

See application file for complete search history.

(56) References Cited

U.S. PATENT DOCUMENTS 3,950,738 A * 4/1976 Hayashi .................. G11C 11/42 365/185.27
4,425,631 A 1/1984 Adam
7,035,146 B2 4/2006 Hemink et al.

(Continued)

FOREIGN PATENT DOCUMENTS

WO WO-2007086050 A2 * 8/2007 ........... H10D 30/681

OTHER PUBLICATIONS

Kaust Discovery, "Memory Device See the Light", Downloaded at https://discovery.kaust.edu.sa/en/article/244/memory-device-sees-the-light on Aug. 26, 2020, 3 pages.

(Continued)

*Primary Examiner* — Jay W. Radke
(74) *Attorney, Agent, or Firm* — The Neudeck Law Firm, LLC

(57) ABSTRACT

A flash memory cell of a flash memory device is illuminated with light during programming and/or erasing. The wavelength of the light is selected such that the photons impinging on the flash memory cell have an energy that approaches the barrier height (conduction band offset) of the tunnel insulator. Illuminating the flash memory cell during programming/erase increases the tunneling current through the tunnel insulator by way of the photon assisted tunneling (PAT) effect.

17 Claims, 12 Drawing Sheets

RECEIVE, BY A FLASH MEMORY CELL, ILLUMINATION
202

WHILE THE FLASH MEMORY CELL IS ILLUMINATED, PERFORM A PROGRAMMING OR ERASE PROCEDURE ON THE FLASH MEMORY CELL
204

(56) References Cited

U.S. PATENT DOCUMENTS

| | | | | |
|---|---|---|---|---|
| 7,535,370 | B2 | 5/2009 | Estakhri | |
| 8,154,926 | B2 | 4/2012 | Aritome | |
| 8,386,861 | B2 | 2/2013 | Chen | |
| 8,415,715 | B2 | 4/2013 | Bhattacharyya | |
| 8,462,548 | B2 | 6/2013 | Aritome | |
| 2004/0004861 | A1 * | 1/2004 | Srinivas | G11C 16/3486 365/185.21 |
| 2005/0083750 | A1 * | 4/2005 | Sakagami | H10B 41/30 257/E27.103 |
| 2006/0120165 | A1 | 6/2006 | Hemink | |
| 2007/0171749 | A1 * | 7/2007 | Frommer | G11C 16/16 365/114 |
| 2010/0046217 | A1 * | 2/2010 | Ngai | G02B 6/0021 362/235 |

OTHER PUBLICATIONS

Manabe, Yukiko et al., "Detailed Observation of Small Leak Current in Flash Memories With Thin Tunnel Oxides", IEEE Transactions on Semiconductor Manufacturing, vol. 12, No. 2, May 1999, pp. 170-174. 5 Pages.

Notification of Transmittal of the International Search Report and the Written Opinion of the International Searching Authority, or the Declaration with Mail Date Dec. 28, 2021 re: Int'l Appln. No. PCT/US2021/053590, 13 pages.

Zhou, Ye et al., "An Upconverted Photonic Nonvolatile Memory", Nature Communications, Retrieved on Jun. 12, 2021. Retrieved from <URL: https://www.nature.com/articles/ncomms5720.pdf>, 2014. DOI: 10.1038/ncomms5720. 8 pages.

* cited by examiner

LED 475
FLASH IC 410
476
470
400

500

FLASH MEMORY DEVICE WITH PHOTON ASSISTED PROGRAMMING

DETAILED DESCRIPTION OF THE EMBODIMENTS

In an embodiment, a flash memory cell of a flash memory device is illuminated with light during programming and/or erasing. The wavelength of the light is selected such that the photons impinging on the flash memory cell have an energy that approaches the barrier height (conduction band offset) of the tunnel insulator. For example, a flash memory cell tunnel insulator made of silicon dioxide ($SiO_2$) typically has a barrier height of approximately 2.8-3.0 eV. Thus, the flash memory cell may be illuminated with light having a photon energy of 2.7 eV during programming and/or erasing. Illuminating the flash memory cell during programming/erase increases the Fowler-Nordheim tunneling current through the tunnel insulator by way of the photon assisted tunneling (PAT) effect. The PAT effect is similar to the photoelectric effect except that the electron struck by the photon in the PAT effect is promoted over the tunnel barrier rather than being removed from the metal.

In an embodiment, increasing the tunneling current through the tunnel insulator during programming/erasing by illuminating the flash memory cell allows shorter program/erase times to be used than would be used without the illumination (for the same programming voltages). Increasing the tunneling current through the tunnel insulator during programming/erasing shortens the program/erase times because the increased tunneling current accumulates/discharges charge on the charge holding layer (e.g., floating gate) of the flash memory cell faster than a lower tunneling current.

In an embodiment, the programming voltage(s) applied during programming/erasing are set lower than non-illuminated flash memory devices thereby reducing the electric field across the tunnel insulator. This reduces power consumed during programming/erasing and improves the endurance of the flash memory cell. The flash memory cell is illuminated during programming in order to increase the tunneling current for the reduced programming voltage(s) thereby maintaining (or approximating) a similar program/erase time as the non-illuminated flash memory devices that use higher programming voltage(s). Various selections of the programming voltages used on an illuminated flash memory cell may be made to accomplish various tradeoffs between speed, power, and/or endurance.

Figure 1A:
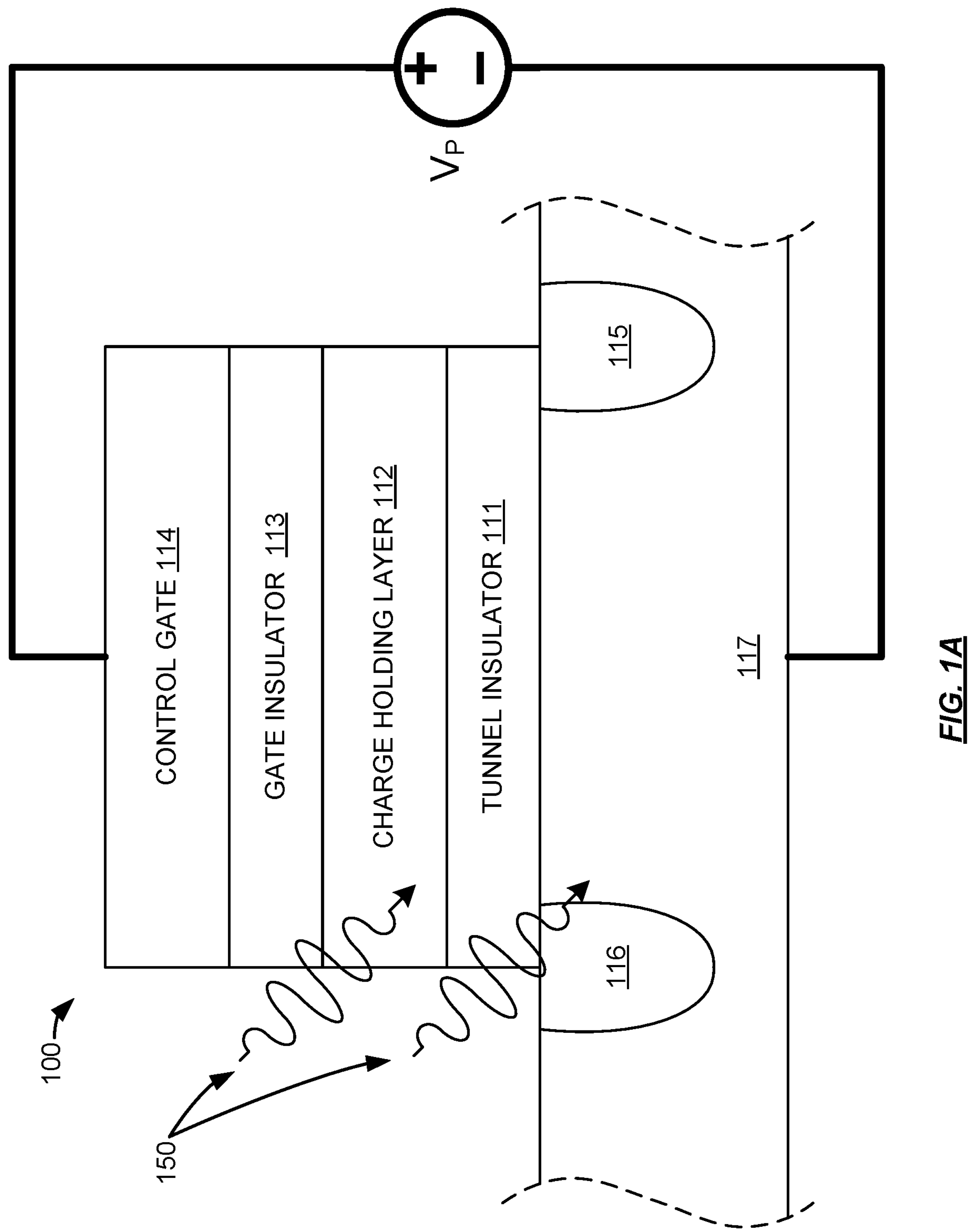
FIGS. 1A-1C are a diagrams illustrating photon assisted flash memory device programming/erasing.
Figure 1B:
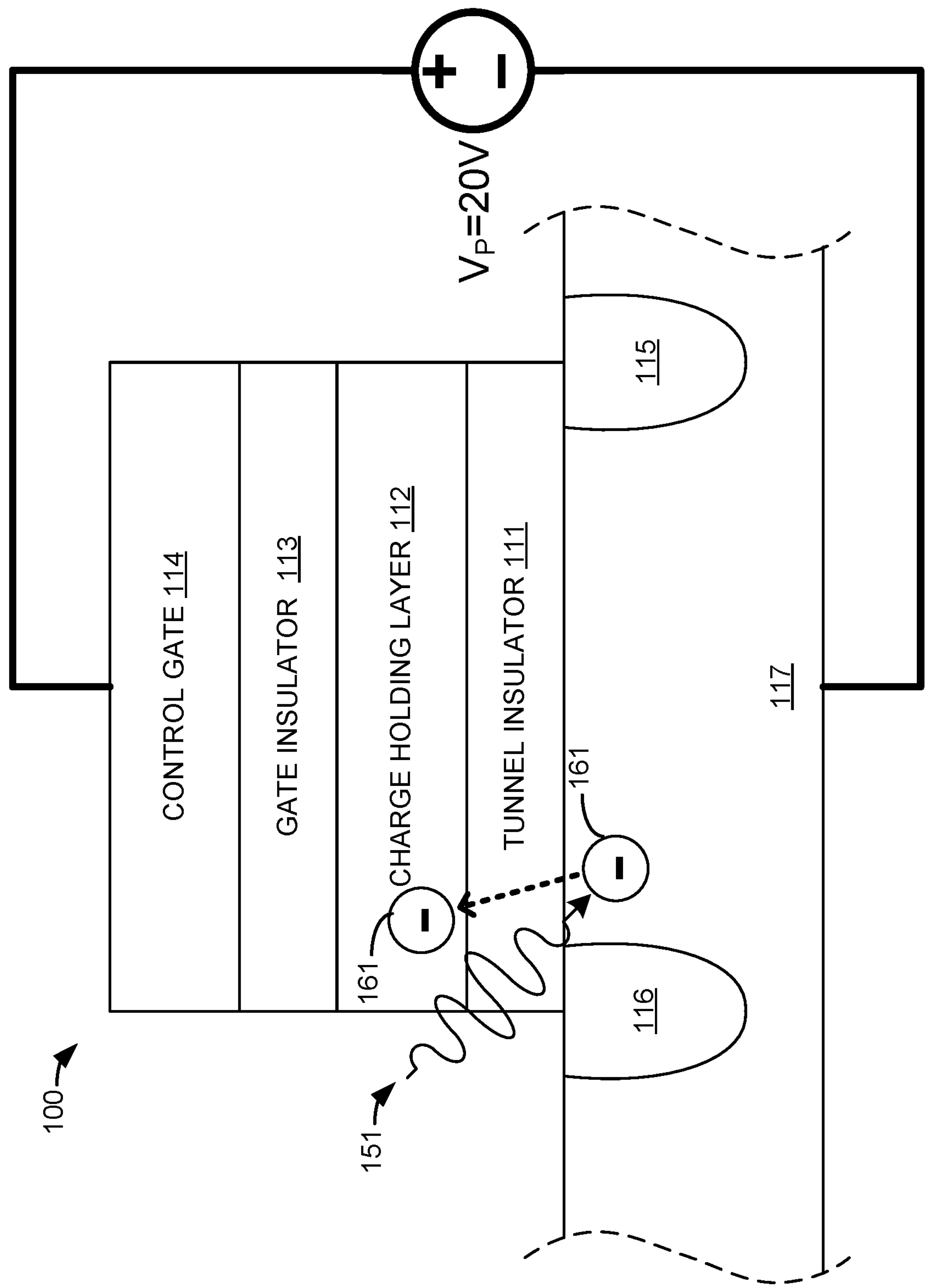
Figure 1C:
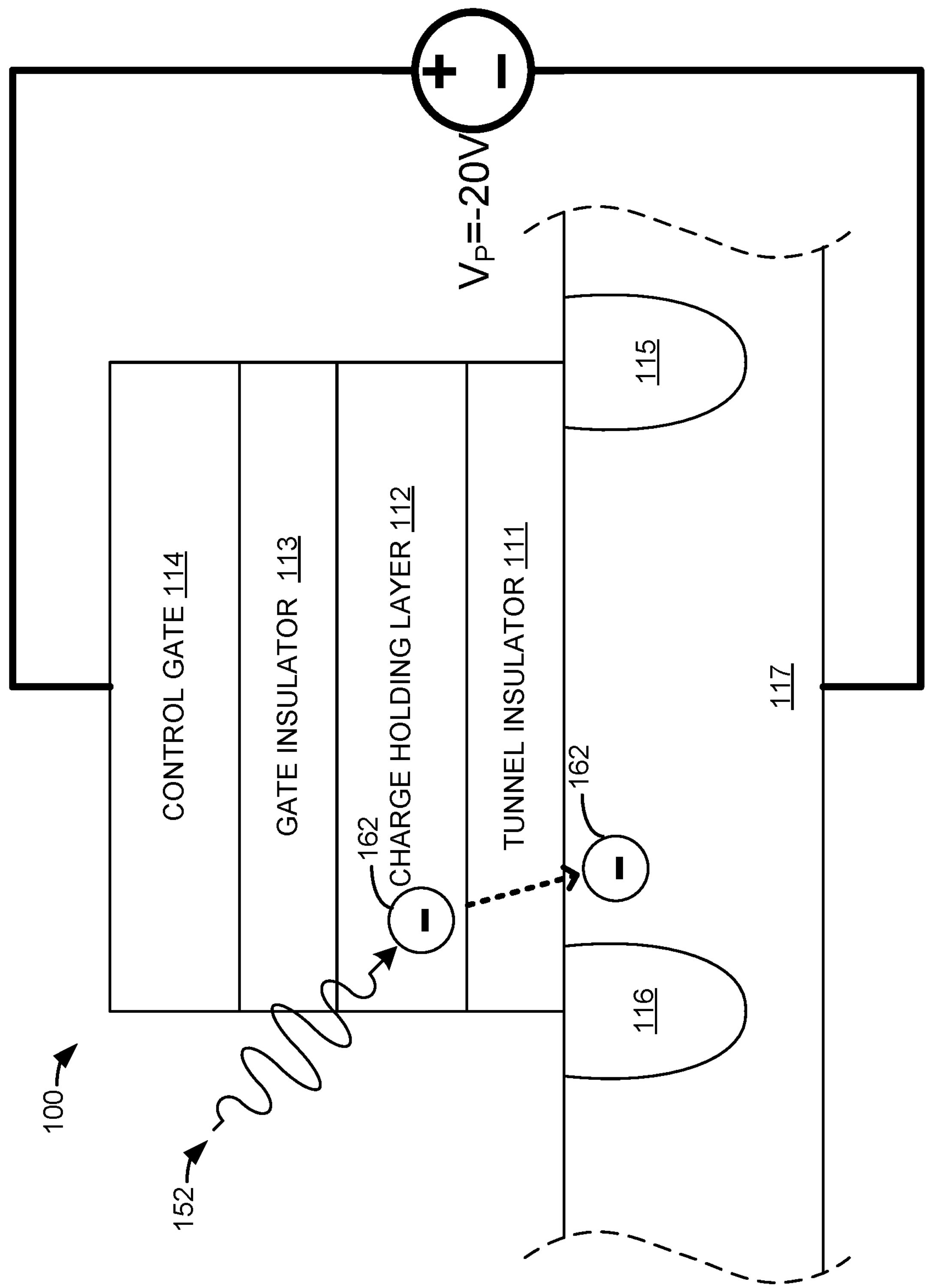

FIGS. 1A-1C are a diagrams illustrating photon assisted flash memory device programming/erasing. In FIGS. 1A-1C, example integrated circuit memory device flash memory cell 100 includes tunnel insulator 111, charge holding layer 112, gate insulator 113, control gate 114, source 115, drain 116, and substrate 117. Source 115 and drain 116 are illustrated as doped regions that are mechanically part of substrate 117 in a well-known integrated circuit metal-oxide-semiconductor field effect transistor (MOSFET) configuration. In FIGS. 1A-1C, flash memory cell 100 is illustrated with tunnel insulator 111 stacked on the surface of substrate 117 (and therefore partially over source 115 and drain 116). Stacked on top of tunnel insulator 111 is charge holding layer 112. Stacked on top of charge holding layer 112 is gate insulator 113. Stacked on top of gate insulator 113 is control gate 114.

It should be understood that flash memory cell 100 as illustrated is a planar flash memory cell structure. It should also be understood, however, that this is merely for illustration purposes. Other flash memory cell structures are contemplated. For example, stacked word plane structures (e.g., 3D NAND) may be used.

In an example, tunnel insulator 111 comprises silicon dioxide ($SiO_2$) and/or other insulating materials such as hafnium oxide ($HfO_2$). Tunnel insulator 111 is typically a layer with a thickness (or thinness) that results in substantial electron tunneling through tunnel insulator 111 when an appropriately high electric field is present across tunnel insulator 111. Charge holding layer 112 may comprise metal, polysilicon, or other materials that trap and release charge from the electrons tunneling through tunnel insulator 111. Gate insulator 113 comprises silicon dioxide ($SiO_2$) and/or other insulating materials such as hafnium oxide ($HfO_2$). Gate insulator 113 is typically a layer with a thickness (or thinness) that is not suitable for allowing substantial electron tunneling through gate insulator 113 when the appropriately high electric field is present across gate insulator 113. Control gate 114 may comprise metal, polysilicon, and/or other conducting materials. In an embodiment, control gate 114 is substantially transparent. Thus, control gate 114 may be or comprise graphene and/or indium tin oxygen (ITO) compositions.

In an embodiment, the refractive index of gate insulator 113 matches (or substantially matches) the refractive index of control gate 114. This reduces the amount of reflection occurring as light passes through flash memory cell 100. For example, for an interface between layers of silicon dioxide (n=1.5) and silicon (n=3.7) approximately 18% of light is reflected at the interface. If one hundred (100) control gate 114 to insulator 113 interfaces are traversed (e.g., in a 3D NAND stack), the amount of light reaching the last layers would be approximately $3\times10^{-9}$ times the amount of light incident of the first layer. However, in another example, an interface between hafnium oxide and an ITO composition having a mismatch in refractive indices of as much as 0.1 would allow about 95% of the incident light to reach the last layer. Thus, in an embodiment, tunnel insulator 111 and gate insulator 113 are hafnium oxide with control gate 114 and charge holding layer 112 comprising an ITO composition with a refractive index that matches (or substantially matches—e.g., with refractive index matching within n±0.1 or n±0.2) the refractive index of tunnel insulator 111 and gate insulator 113.

In an embodiment, at least substrate (channel silicon) 117 and charge holding layer 112 are illuminated with incoming photons 150 while a programming voltage (Vp) is concurrently applied between control gate 114 and substrate 117. The energy of photons 150 is selected such that the photon 150 striking electrons in charge holding layer 112 and substrate 117 have an energy that approaches the barrier height (conduction band offset) of tunnel insulator 111. For example, tunnel insulator 111 may be made of a thin layer of silicon dioxide ($SiO_2$) such that tunnel insulator 111 has a barrier height of approximately 2.8-3.0 eV. When a photon 150 with an energy of 2.7 eV strikes an electron in in charge holding layer 112 or substrate 117 while a sufficient programming voltage $V_P$ is applied between control gate 114 and substrate 117, that electron is promoted over the barrier of tunnel insulator 111 causing an increased Fowler-Nordheim tunnel current to flow. PAT between silicon dioxide and aluminum is described in more detail in the paper by Z. A. Weinberg and A. Hartstein, "Photon Assisted Tunneling from Aluminum into Silicon Dioxide", Solid State Communications, vol. 20, pp. 179-182 (1976) which is hereby incorporated herein for all purposes.

In an embodiment, increasing the tunneling current through tunnel insulator 111 by photons 150 hitting charge holding layer 112 or substrate 117 while a sufficient programming voltage $V_P$ is concurrently applied between control gate 114 and substrate 117 allows shorter program/erase times to be used than would be used without photons 150. Increasing the tunneling current through tunnel insulator 111 during programming/erasing with a sufficient $V_P$ shortens the program/erase times because the increased tunneling current accumulates/discharges charge on charge holding layer 112 faster than a lower tunneling current.

In an embodiment, the programming voltage $V_P$ applied during programming/erasing while photons 150 are illuminating charge holding layer 112 and substrate 117 is set lower than a $V_P$ that would be selected for a non-illuminated flash memory device. This reduces the electric field across tunnel insulator 111. Using a lower programming voltage $V_P$ during programming/erasing while photons 150 are illuminating charge holding layer 112 and substrate 117 reduces power consumed during programming/erasing. Using a reduced electric field across tunnel insulator 111 improves the endurance of tunnel insulator 111 and thereby increases the endurance of flash memory cell 100. In an embodiment, charge holding layer 112 and substrate 117 are illuminated by photons 150 while programming using the reduced $V_P$. Without the illumination by photons 150, the program/erase time would be increased by the reduced $V_P$. However, because illumination by photons 150 increases the tunneling current for the reduced $V_P$, the same or similar program/erase times as non-illuminated flash memory devices that use higher programming voltage(s) may be achieved. It should be understood that various selections of the programming voltages ($V_P$) and photon 150 flux used on flash memory cell 100 may be made to accomplish various tradeoffs between speed, power, and/or endurance.

FIG. 1B illustrated the photon assisted tunneling process of programming/erasing flash memory cell 100 by moving electrons from substrate 117 to charge holding layer 112. In FIG. 1B, a photon 151 illuminates substrate 117 and strikes electron 161 while a programming voltage of $V_P$=20V is applied between control gate 114 and substrate 117. The electric field caused by $V_P$ and the energy imparted to electron 161 by photon 151 allows electron 161 to have enough energy to tunnel through tunnel insulator 111 to charge holding layer 112. This is illustrated in FIG. 1B by the dotted arrow from electron 161 in substrate 117 to electron 161 in charge holding layer 112.

FIG. 1C illustrated the photon assisted tunneling process of programming/erasing flash memory cell 100 by moving electrons from charge holding layer 112 to substrate 117. In FIG. 1C, a photon 152 illuminates charge holding layer 112 and strikes electron 162 while a programming voltage of $V_P$=−20V is applied between control gate 114 and substrate 117. The electric field caused by $V_P$ and the energy imparted to electron 162 by photon 152 allows electron 162 to have enough energy to tunnel through tunnel insulator 111 to substrate 117. This is illustrated in FIG. 1C by the dotted arrow from electron 162 in charge holding layer 112 to electron 162 in substrate 117.

Figure 2:
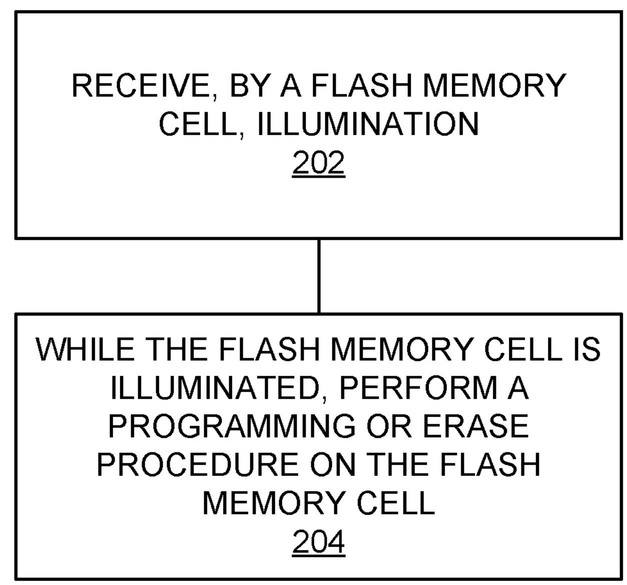
FIG. 2 is a flowchart illustrating a method of programming/erasing a flash memory device.

FIG. 2 is a flowchart illustrating a method of programming/erasing a flash memory device. One or more steps illustrated in FIG. 2 may be performed by or on, for example, flash memory cell 100 and/or its components. Illumination is received by a flash memory cell (202). For example, photons 150 may illuminate flash memory cell 100 and charge holding layer 112 and substrate 117, in particular.

While the flash memory cell is illuminated, perform a programming or erase procedure on the flash memory cell (204). For example, while photons 151 are illuminating substrate 117 of flash memory cell 100, a programming voltage (e.g., $V_P$=20V) may be applied that, in combination with photons 151 causes electrons 161 to tunnel from substrate 117, through tunnel insulator 111, to charge holding layer 112, thereby programming flash memory cell 100 with a value (e.g., "1" or "0"). In another example, while photons 152 are illuminating charge holding layer 112 of flash memory cell 100, a programming voltage (e.g., $V_P$=−20V) may be applied that, in combination with photons 152 causes electrons 162 to tunnel from charge holding layer 112, through tunnel insulator 111, to substrate 117, thereby erasing flash memory cell 100 to an erased a value (e.g., "0" or "1").

It should be understood that the application of the programming voltage and the illumination may occur in any order. Thus, it should be understood that the application of the programming voltage and the start of the illumination may be performed: (1) by applying the programming voltage and starting the illumination at the same (or substantially the same) time; (2) by applying the programming voltage first and starting the illumination second; and/or (3) by starting the illumination first and applying the programming voltage second. Likewise, the termination of the programming voltage and the end of the illumination may be performed: (1) by terminating the programming voltage and ending the illumination at the same (or substantially the same) time; (2) by terminating the programming voltage first and ending the illumination second; and/or (3) by ending the illumination first and terminating the programming voltage second.

Figure 3A:
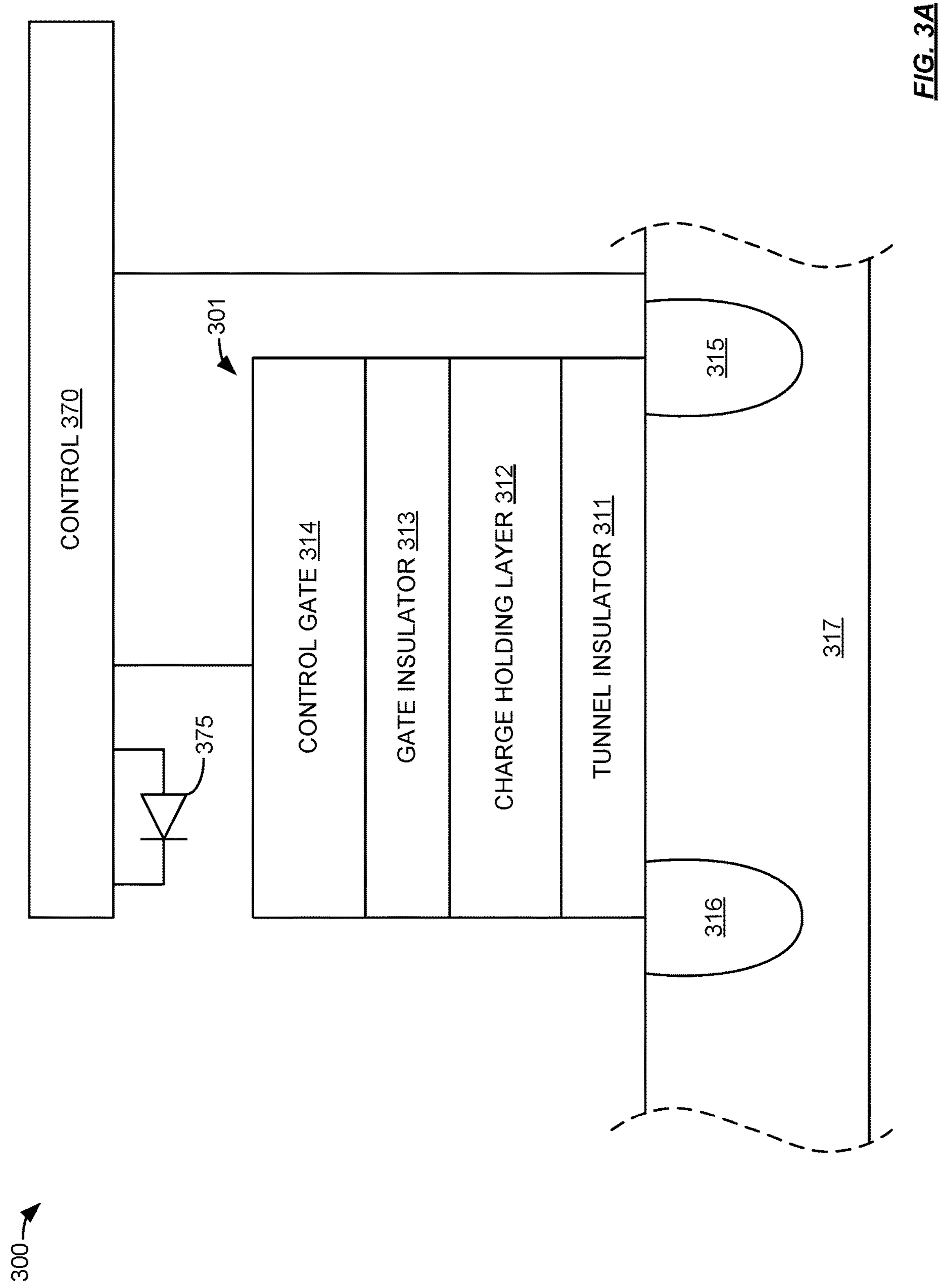
FIGS. 3A-3C are diagrams illustrating a photon assisted flash memory device.
Figure 3B:
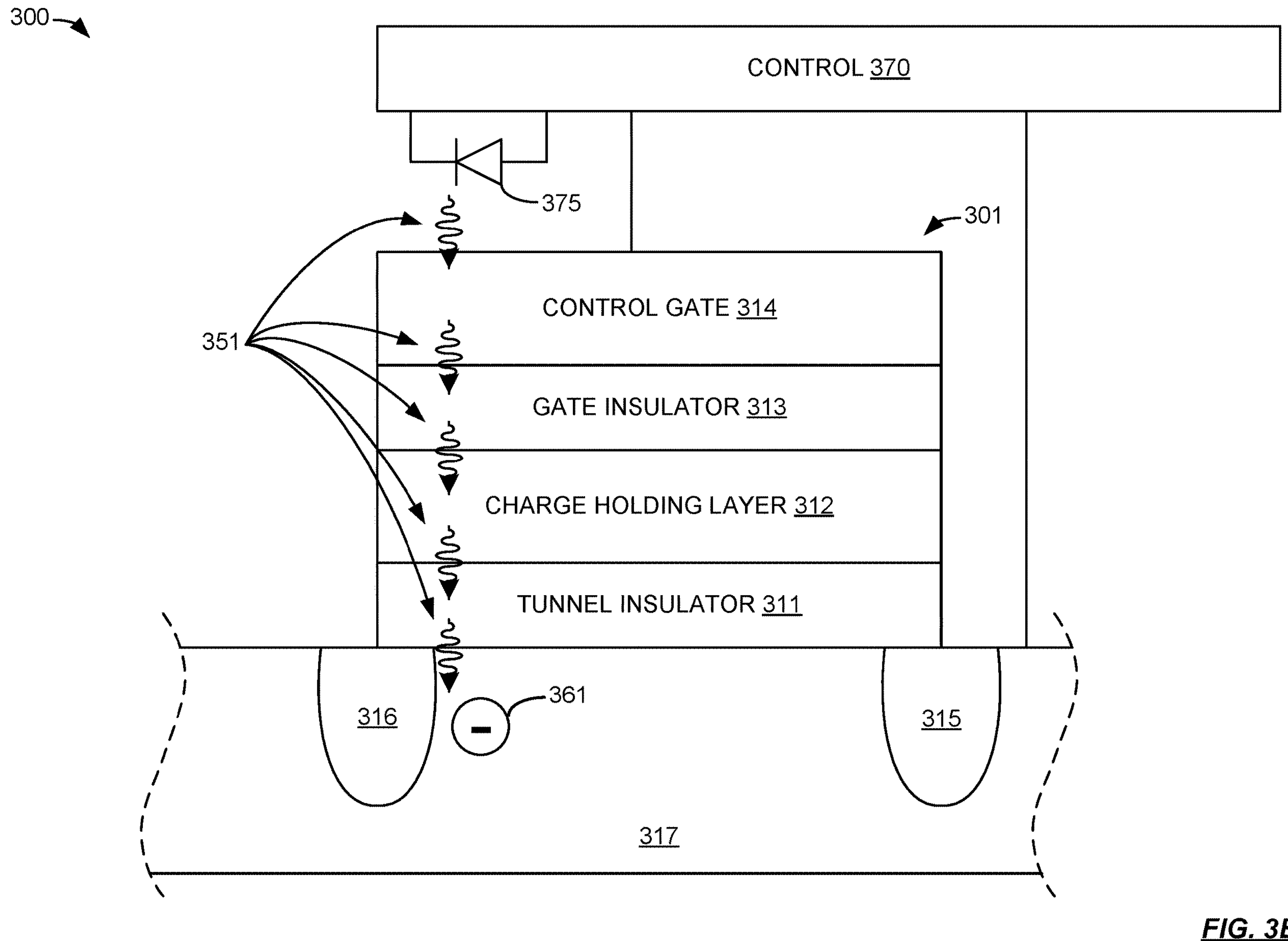
Figure 3C:
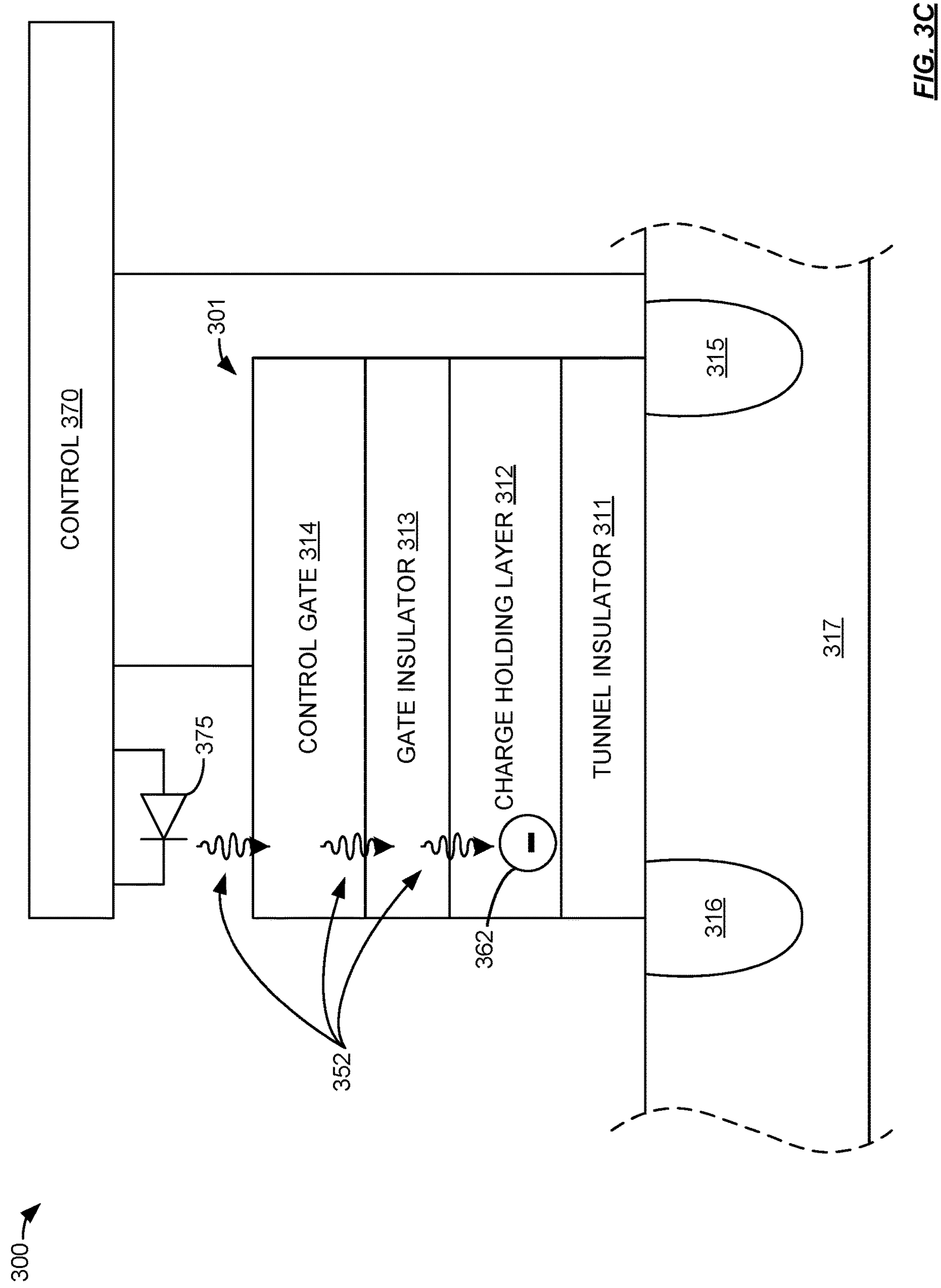

FIGS. 3A-3C are diagrams illustrating a photon assisted flash memory device. In FIGS. 3A-3C, example integrated circuit flash memory device 300 includes flash memory cell 301, control 370, and photon source 375.

Flash memory cell 301 includes tunnel insulator 311, charge holding layer 312, gate insulator 313, control gate 314, source 315, drain 316, and substrate 317. Source 315 and drain 316 are illustrated as doped regions that are mechanically part of substrate 317 in a well-known integrated circuit metal-oxide-semiconductor field effect transistor (MOSFET) configuration. In FIGS. 3A-3C, flash memory cell 301 is illustrated with tunnel insulator 311 stacked on the surface of substrate 317 (and therefore partially over source 315 and drain 316). Stacked on top of tunnel insulator 311 is charge holding layer 312. Stacked on top of charge holding layer 312 is gate insulator 313. Stacked on top of gate insulator 313 is control gate 314.

It should be understood that flash memory cell 301 as illustrated is a planar flash memory cell structure. It should also be understood, however, that this is merely for illustration purposes. Other flash memory cell structures are contemplated. For example, stacked word line structures (e.g., 3D NAND) may be used.

In an example, tunnel insulator 311 comprises silicon dioxide ($SiO_2$) and/or other insulating materials. Tunnel insulator 311 is typically a layer with a thickness (or thinness) that is suitable for allowing substantial electron tunneling through tunnel insulator 311 when an appropriately high electric field is present across tunnel insulator 311. Charge holding layer may comprise metal, polysilicon, or other materials that trap and release charge from the electrons tunneling through tunnel insulator 311. Gate insulator 313 comprises silicon dioxide ($SiO_2$) and/or other insulating materials. Gate insulator 313 is typically a layer with a thickness (or thinness) that is not suitable for allowing substantial electron tunneling through gate insulator 313 when the appropriately high electric field is present across gate insulator 313. Control gate 314 may comprise metal, polysilicon, and/or other conducting materials. In an embodiment, control gate 314 is substantially transparent. Thus, control gate 314 may be or comprise graphene and/or indium tin oxygen (ITO) compositions. Control gate 314 may be part of a wordline in an array of flash memory cells. The wordlines of flash memory device 300 may also be substantially transparent. Thus, the wordlines of flash memory device 300 may be or comprise graphene and/or indium tin oxygen (ITO) compositions.

In an embodiment, the refractive index of gate insulator 313 matches (or substantially matches) the refractive index of control gate 314. This reduces the amount of reflection occurring as light passes through flash memory cell 301. For example, for an interface between layers of silicon dioxide (n=1.5) and silicon (n=3.7) approximately 18% of light is reflected at the interface. If one hundred (100) control gate 114 to insulator 113 interfaces are traversed (e.g., in a 3D NAND stack), the amount of light reaching the last layers would be approximately $3\times10^{-9}$ times the amount of light incident of the first layer. However, in another example, an interface between hafnium oxide and an ITO composition having a mismatch in refractive indices of as much as 0.1 would allow about 95% of the incident light to reach the last layer. Thus, in an embodiment, tunnel insulator 311 and gate insulator 313 are hafnium oxide with control gate 314 and charge holding layer 312 comprising an ITO composition with a refractive index that matches (or substantially matches—e.g., with refractive index matching within n±0.1 or n±0.2) the refractive index of tunnel insulator 311 and gate insulator 313.

Photon source 375 is selected such that energy of photons 351 have an energy that approaches the barrier height (conduction band offset) of tunnel insulator 311. For example, tunnel insulator 311 may be made of a thin layer of silicon dioxide ($SiO_2$) such that tunnel insulator 311 has a barrier height of approximately 2.8-3.0 eV.

As illustrated in FIG. 3B, control 370 may selectively cause photon source 375 to emit photons 351 and to not emit photons 351. When photon source 375 is emitting photons 351, some of these photons 351 pass through control gate 314, gate insulator 313, charge holding layer 312, tunnel insulator 311 and strike electrons in substrate (channel silicon) 317. When photons 351 strike electrons 361 while control 370 concurrently applies a sufficient programming voltage $V_P$ between control gate 314 and substrate 317, the electrons 361 are promoted over the barrier of tunnel insulator 311 causing an increased Fowler-Nordheim tunnel current to flow from substrate 317 to charge holding layer 312.

In an embodiment, increasing the tunneling current through tunnel insulator 311 by photons 351 hitting substrate 317 while control 370 selectively applies a first programming voltage (e.g., $V_P$=20V) between control gate 314 and substrate 317 allows shorter program/erase times to be used than would be used without control 370 causing photon source 375 to emit photons 351. In an embodiment, a second programming voltage (e.g., $V_P$=15V) is selectively applied by control 370 during programming/erasing while photons 351 are illuminating substrate 317 that is lower than the first programming voltage. This reduces the electric field across tunnel insulator 311. Using the second (lower) programming voltage during programming/erasing while photons 351 are illuminating substrate 317 reduces power consumed during programming/erasing. Using the reduced electric field across tunnel insulator 311 (i.e., by using the second programming voltage) improves the endurance of tunnel insulator 311 and thereby increases the endurance of flash memory device 300.

As illustrated in FIG. 3C, control 370 may selectively cause photon source 375 to emit photons 352 and to not emit photons 352. When photon source 375 is emitting photons 352, some of these photons 352 pass through control gate 314, gate insulator 313, charge holding layer 312, and strike electrons in charge holding layer 312. When photons 352 strike electrons 362 while control 370 concurrently applies a sufficient programming voltage $V_P$ between control gate 314 and substrate 317, the electrons 362 are promoted over the barrier of tunnel insulator 311 causing an increased tunnel current to flow from charge holding layer 312 to substrate 317.

In an embodiment, increasing the tunneling current through tunnel insulator 311 by photons 351 hitting charge holding layer 312 while control 370 selectively applies a first programming voltage (e.g., $V_P$=−20V) between control gate 314 and substrate 317 allows shorter program/erase times to be used than would be used without control 370 causing photon source 375 to emit photons 352. In an embodiment, a second programming voltage (e.g., $V_P$=−15V) is selectively applied by control 370 during programming/erasing while photons 352 are illuminating charge holding layer 312 that is lower than the first programming voltage. This reduces the electric field across tunnel insulator 311. Using the second (lower) programming voltage during programming/erasing while photons 352 are illuminating charge holding layer 312 reduces power consumed during programming/erasing. Using the reduced electric field across tunnel insulator 311 (i.e., by using the second programming voltage) improves the endurance of tunnel insulator 311 and thereby increases the endurance of flash memory device 300.

In an embodiment, control 370 may include circuitry to indicate, to a memory controller, that control 370 may selectively cause photon source 375 to emit photons 351 and to not emit photons 351. In an embodiment, control 170 may include circuitry (e.g. a register), controlled by a memory controller, that causes memory device 300 to operate in a 'legacy' mode that does not utilize photon source 375, shorter program/erase times, and/or lower programming/erase voltages. In an embodiment, control 370 may include circuitry to (e.g., a register), controlled by a memory controller, to selectively activate or deactivate the illumination of flash memory cell 301 during programming/erasing. In an embodiment, control 370 may include circuitry, controlled by a memory controller, that causes shorter program/erase times when photon source 375 is emitting photons 352 than when photon source is not emitting photons 352. In an embodiment, control 370 may include circuitry, controlled by a memory controller, to use a lower programming voltage during programming/erasing when photons 352 are illuminating charge holding layer 312 than when photons 352 are not illuminating charge holding layer 312.

Figure 4:
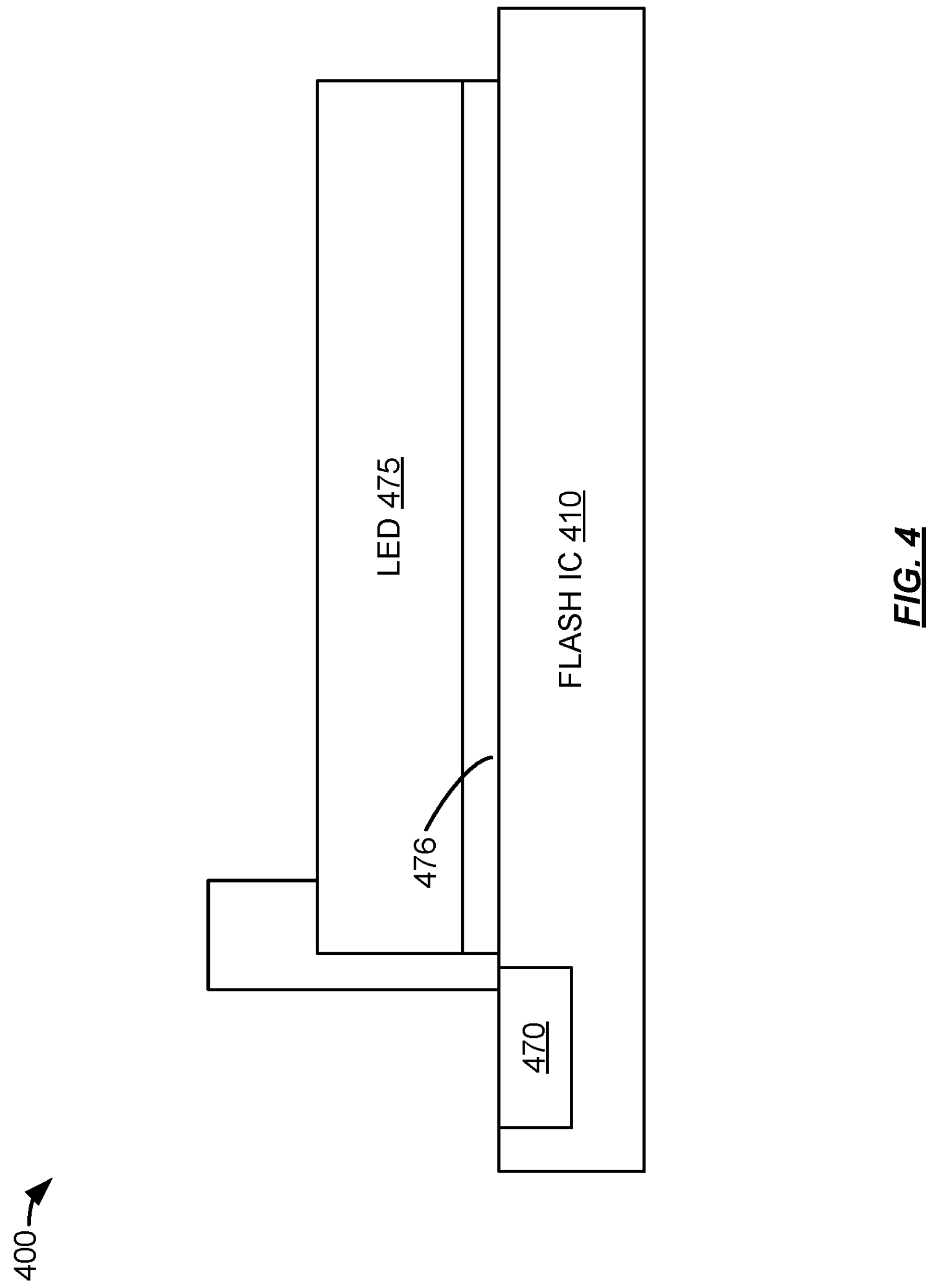
FIG. 4 is a diagram illustrating an integrated photon assisted flash memory device.

FIG. 4 is a diagram illustrating an integrated photon assisted flash memory device. In FIG. 4, memory device 400 comprises flash memory integrated circuit 410, light emitting diode device 475, and bonding material 476. Flash memory integrated circuit 410 includes control 470. Control 470 is operatively coupled to LED 475. Control 470 is operatively coupled to LED 475 to selectively illuminate and de-illuminate flash memory integrated circuit 410 and one or more arrays of flash memory cells (e.g., flash memory cells 100 and/or flash memory cells 300) that comprise flash memory integrated circuit 410, in particular. Control 470 may drive power to LED 475 synchronized with program/erase cycles such that one or more arrays of flash memory cells that comprise flash memory integrated circuit 410 are illuminated concurrently with program/erase cycles and are not illuminated during read cycles.

In an embodiment, flash memory integrated circuit 410 comprises NAND type flash memory device arrays. In an embodiment, flash memory integrated circuit 410 comprises 3D NAND stacked arrays of flash memory devices. In an embodiment, bonding material 476 comprises a transparent (or mostly transparent) epoxy.

In an embodiment, control 470 and LED 475 may be configured to illuminate all of the circuitry of flash memory integrated circuit 410. In an embodiment, control 470 and LED 475 may be configured to illuminate only portions of the circuitry of flash memory integrated circuit 410. For example, control 470 and LED 475 may be configured to selectively illuminate the flash memory device array that is being programmed/erased while minimizing the illumination of control 470. Thus, for example, control circuitry 470 may be covered by an opaque material (not shown in FIG. 4) while the flash memory arrays of flash memory integrated circuit 410 are not.

Figure 5A:
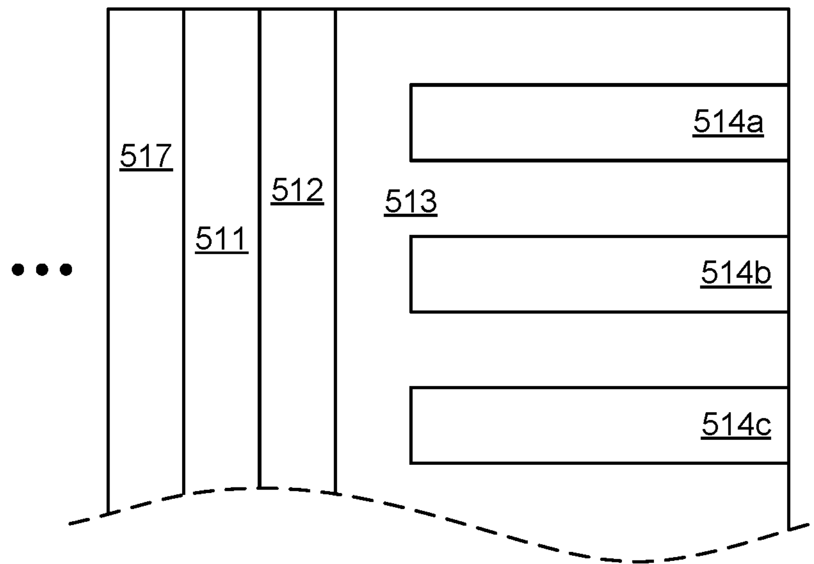
FIGS. 5A-5B are diagrams illustrating a photon assisted 3D NAND flash memory device.
Figure 5A:
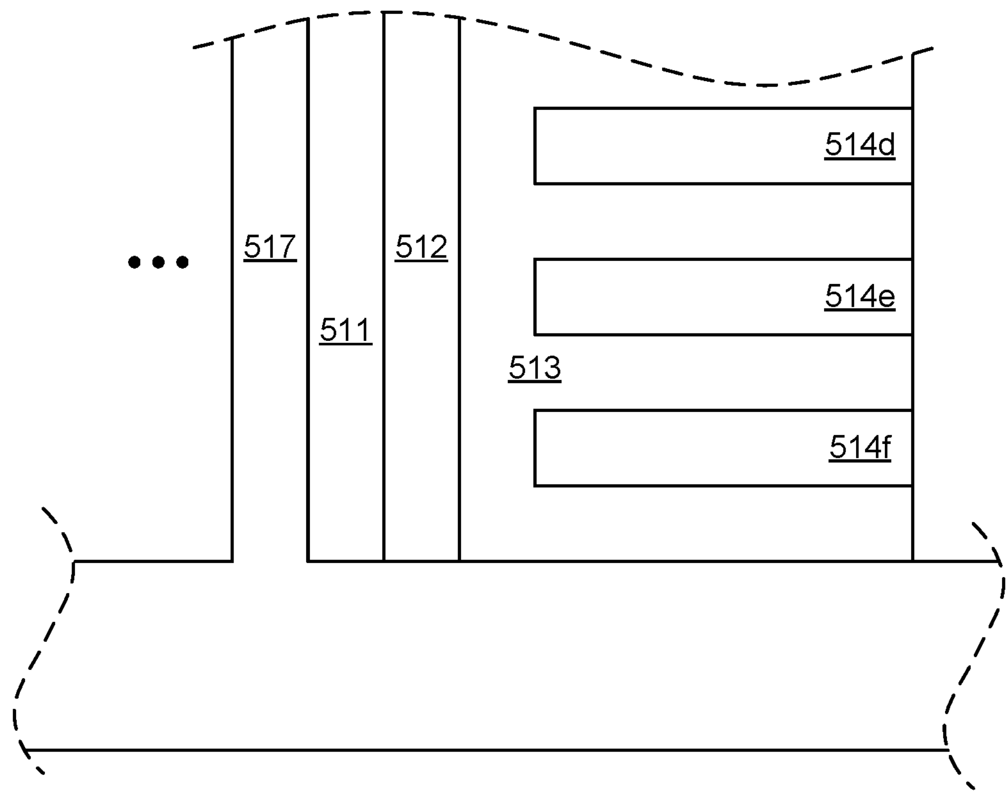
Figure 5B:
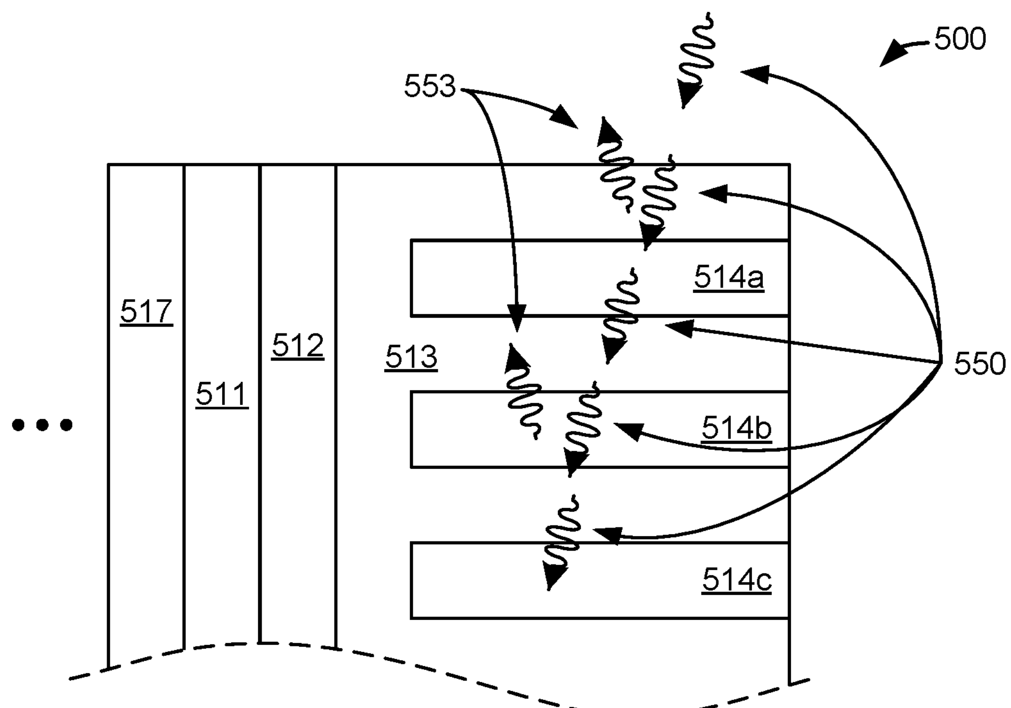
Figure 5B:
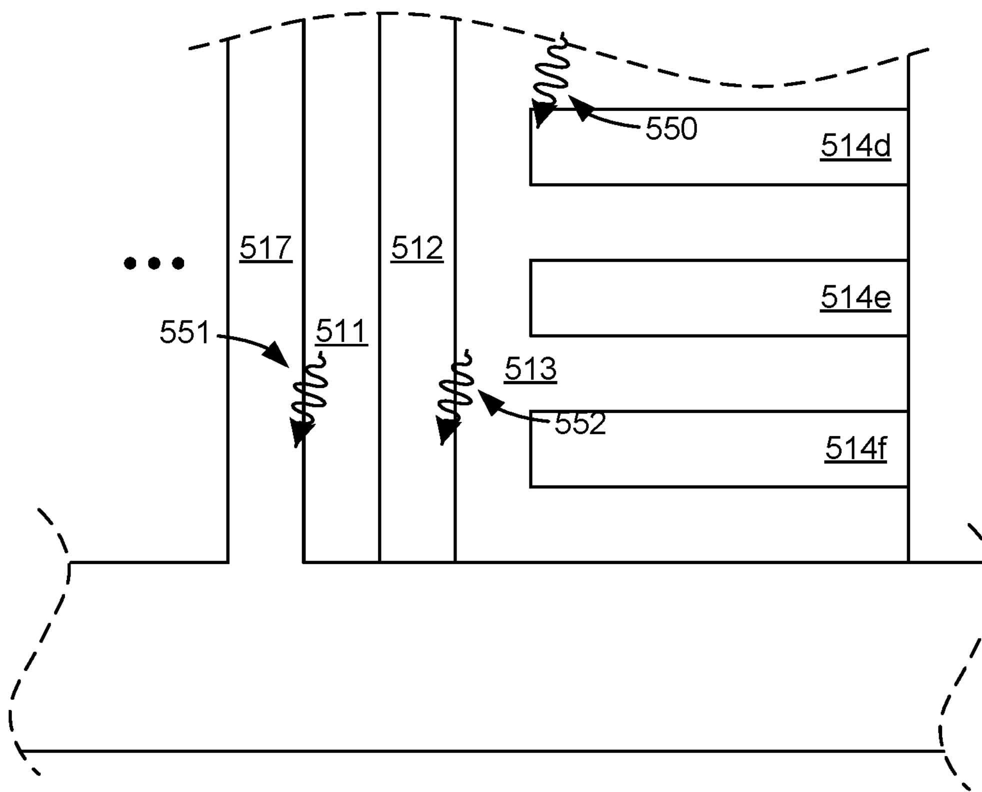

FIGS. 5A-5B are diagrams illustrating a photon assisted 3D NAND flash memory device. In FIGS. 5A-5B, example integrated circuit memory device flash memory cell 500 includes tunnel insulator 511, charge holding layer 512, gate and word plane insulator 513, control gates **514*a*-514*f*, and channel/substrate 517**.

In an example, tunnel insulator 511 comprises silicon dioxide ($SiO_2$) and/or other insulating materials such as hafnium oxide ($HfO_2$). Tunnel insulator 511 typically has a thickness (or thinness) that results in substantial electron tunneling through tunnel insulator 511 when an appropriately high electric field is present across tunnel insulator 511. In FIGS. 5A-charge holding layer 512 a insulating material (e.g., SiN) that traps and release charge from the electrons tunneling through tunnel insulator 511. In other embodiments, charge holding layer 512 may comprise separate islands of conductive metal, polysilicon, or other material. Gate and word plane insulator 513 comprises silicon dioxide ($SiO_2$) and/or other insulating materials such as hafnium oxide ($HfO_2$). Gate and word plane insulator 513 is typically a layer with a thickness (or thinness) that is not suitable for allowing substantial electron tunneling through gate and word plane insulator 513 when the appropriately high electric field is present across gate insulator 513. Control gates **514*a*-514*f* may comprise metal, polysilicon, and/or other conducting materials. In an embodiment, control gates 514*a*-514*f* are substantially transparent. Thus, control gates 514*a*-514*f*** may be or comprise graphene and/or indium tin oxygen (ITO) compositions.

In an embodiment, the refractive index of gate and word plane insulator 513 matches (or substantially matches) the refractive index of control gates **514*a*-514*f*. This reduces the amount of reflection occurring as light passes through flash memory cell 500. For example, for an interface between layers of silicon dioxide (n=1.5) and silicon (n=3.7) approximately 18% of light is reflected at the interface. This is illustrated in FIG. 5B by photons 550 and reflected photons 553. If one hundred (100) control gates 514*a*-514*f* to gate and word plane insulator 513 interfaces are traversed, the amount of light reaching the last layers would be approximately $3\times10^{-9}$ times the amount of light incident of the first layer. However, in another example, an interface between hafnium oxide and an ITO composition having a mismatch in refractive indices of as much as 0.1 would allow about 95% of the incident light to reach the last layer. This is illustrated in FIG. 5B by photons 551-552 incident on channel/substrate 517 and charge holding layer 512 in the vicinity of the lowest control gate 514*f*. Thus, in an embodiment, gate and word plane insulator 513 are hafnium oxide with control gates 514*a*-514*f* comprising an ITO composition with a refractive index that matches (or substantially matches—e.g., with refractive index matching within n±0.1 or n±0.2) the refractive index of gate and word plane insulator 513**.

Figure 6:
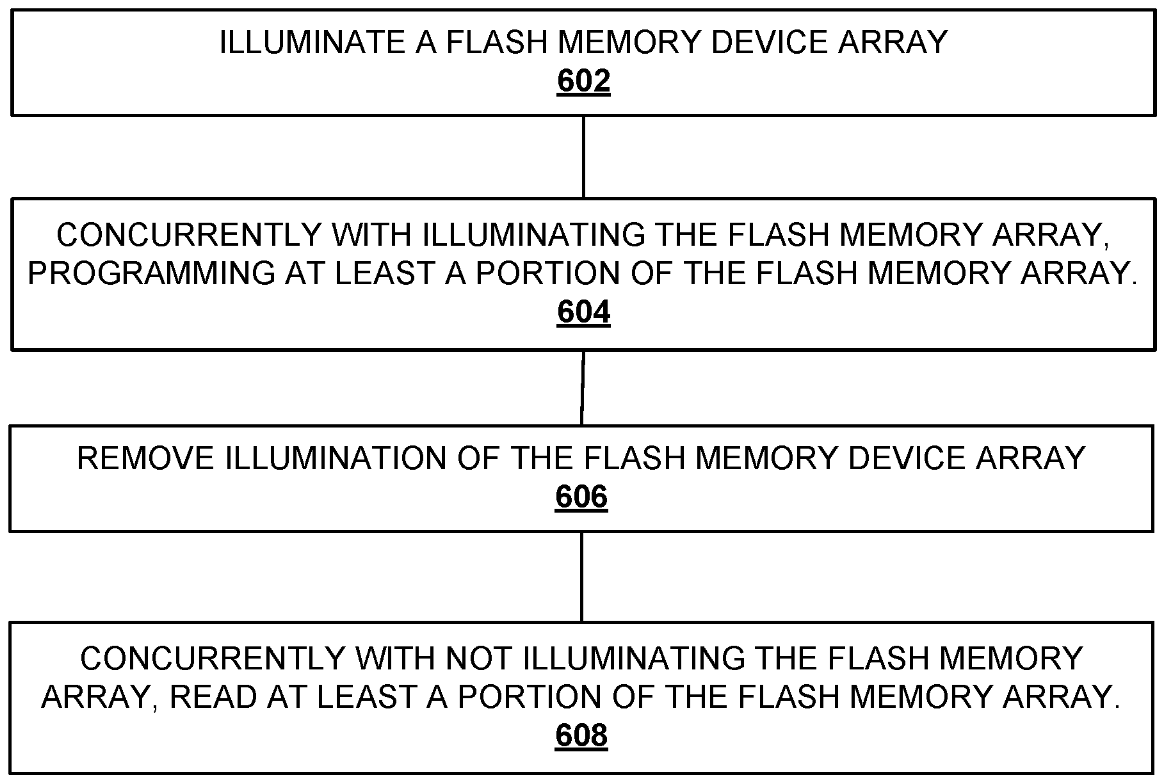
FIG. 6 is a flowchart illustrating a method of operating a photon assisted flash memory device.

FIG. 6 is a flowchart illustrating a method of operating a photon assisted flash memory device. One or more steps illustrated in FIG. 6 may be performed by or on, for example, flash memory cell 100, flash memory cell 300, memory device 400, flash memory cell 500 and/or their components. A flash memory device array is illuminated (502). For example, an array of flash memory cells 300 on flash memory integrated circuit 410 may be illuminated by, responsive to control 470, turning on one or more portions, or all, of LED 475.

Concurrently with illuminating the flash memory array, programming at least a portion of the flash memory array (604). For example, control 470 may program/erase one or more memory cells 301 (e.g., a NAND chain or stack of memory cells 301) of an array of flash memory cells 300 on flash memory integrated circuit 410 while those memory cells 301 are being illuminated by LED 475. It should be understood that the application of the programming voltage and the start of the illumination may occur in any order. Thus, it should be understood that the application of the programming voltage and the start of the illumination may be performed: (1) by applying the programming voltage and starting the illumination at the same (or substantially the same) time; (2) by applying the programming voltage first and starting the illumination second; and/or (3) by starting the illumination first and applying the programming voltage second.

The illumination of the flash memory device is removed (606). For example, responsive to control 470, LED 475 may be turned off thereby removing the illumination of the array of flash memory cells 300 on flash memory integrated circuit 410. It should be understood that the removal of the programming voltage and the removal of the illumination may occur in any order. Thus, the termination of the programming voltage and the end of the illumination may be performed: (1) by terminating the programming voltage and ending the illumination at the same (or substantially the same) time; (2) by terminating the programming voltage first and ending the illumination second; and/or (3) by ending the illumination first and terminating the programming voltage second.

Concurrently with not illuminating the flash memory array, at least a portion of the flash memory array is read (608). For example, control 470 may read one or more memory cells 301 (e.g., a row of cells) of an array of flash memory cells 300 on flash memory integrated circuit 410 while the memory cells 301 being read are not being illuminated by LED 475.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of flash memory cell 100, flash memory cell 300, memory device 400, flash memory cell 500, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 7:
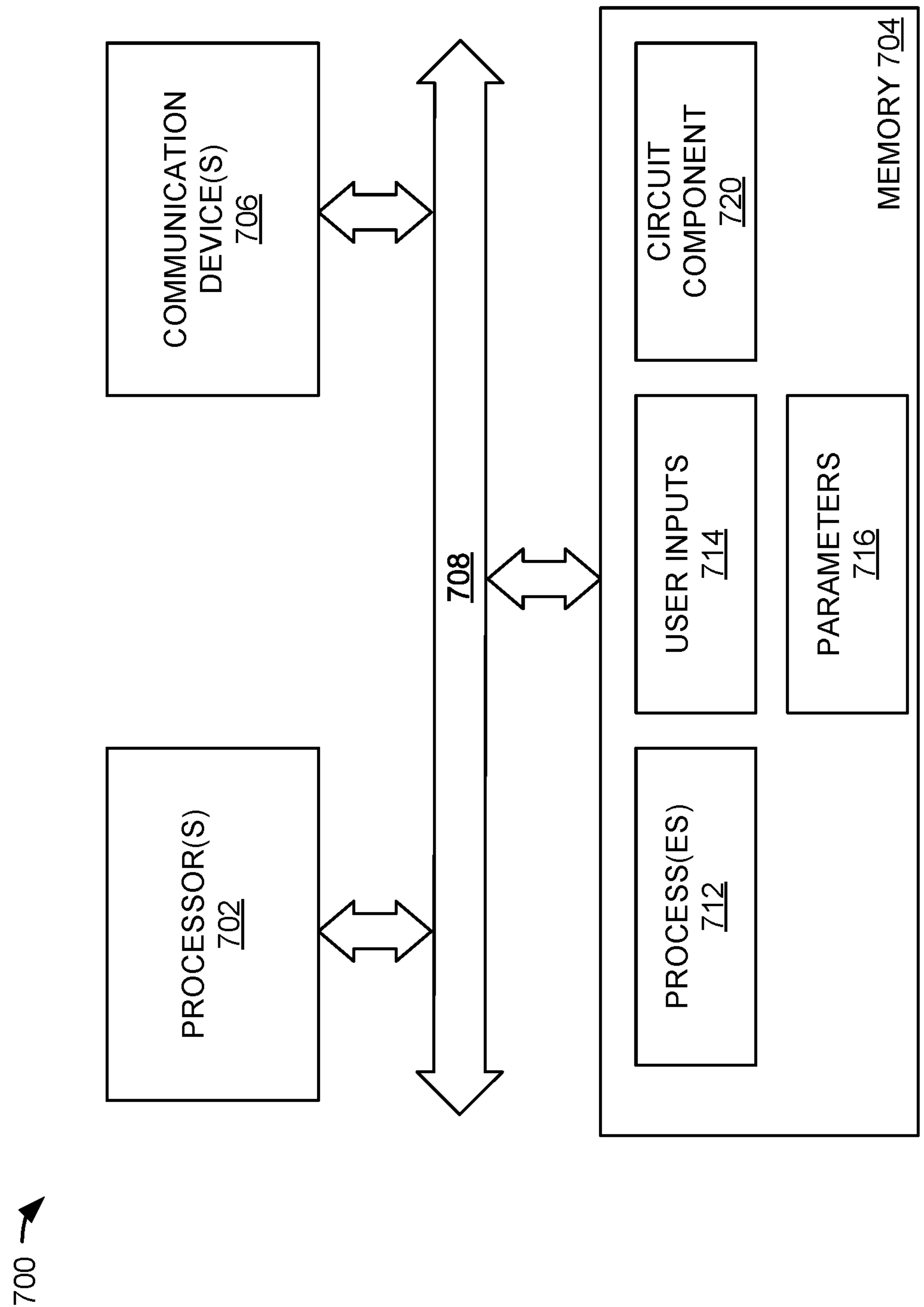
FIG. 7 is a block diagram of a processing system.

FIG. 7 is a block diagram illustrating one embodiment of a processing system 700 for including, processing, or generating, a representation of a circuit component 720. Processing system 700 includes one or more processors 702, a memory 704, and one or more communications devices 706. Processors 702, memory 704, and communications devices 706 communicate using any suitable type, number, and/or configuration of wired and/or wireless connections 708.

Processors 702 execute instructions of one or more processes 712 stored in a memory 704 to process and/or generate circuit component 720 responsive to user inputs 714 and parameters 716. Processes 712 may be any suitable electronic design automation (EDA) tool or portion thereof used to design, simulate, analyze, and/or verify electronic circuitry and/or generate photomasks for electronic circuitry. Representation 720 includes data that describes all or portions of flash memory cell 100, flash memory cell 300, memory device 400, flash memory cell 500, and their components, as shown in the Figures.

Representation 720 may include one or more of behavioral, register transfer, logic component, transistor, and layout geometry-level descriptions. Moreover, representation 720 may be stored on storage media or communicated by carrier waves.

Data formats in which representation 720 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 714 may comprise input parameters from a keyboard, mouse, voice recognition interface, microphone and speakers, graphical display, touch screen, or other type of user interface device. This user interface may be distributed among multiple interface devices. Parameters 716 may include specifications and/or characteristics that are input to help define representation 720. For example, parameters 716 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 704 includes any suitable type, number, and/or configuration of non-transitory computer-readable storage media that stores processes 712, user inputs 714, parameters 716, and circuit component 720.

Communications devices 706 include any suitable type, number, and/or configuration of wired and/or wireless devices that transmit information from processing system 700 to another processing or storage system (not shown) and/or receive information from another processing or storage system (not shown). For example, communications devices 706 may transmit circuit component 720 to another system. Communications devices 706 may receive processes 712, user inputs 714, parameters 716, and/or circuit component 720 and cause processes 712, user inputs 714, parameters 716, and/or circuit component 720 to be stored in memory 704.

Implementations discussed herein include, but are not limited to, the following examples:

Example 1: A memory device, comprising: an array of flash memory cells; and, a light source to selectively direct light into the array of flash memory cells to enhance programming performance.

Example 2: The memory device of example 1, wherein the light source receives light to be directed into the array of flash memory cells from a source external to the memory device.

Example 3: The memory device of example 1, wherein the light source generates light.

Example 4: The memory device of example 1, wherein a programming performance is enhanced by a reduction of a programming time of flash cells of the array of flash memory cells.

Example 5: The memory device of example 1, wherein a programming performance is enhanced by increasing a number of programming cycles flash cells of the array of flash memory cells are to be reliably programmed.

Example 6: The memory device of example 1, wherein a programming performance is enhanced by decreasing an amount of power consumed during programming cycles of flash cells of the array of flash memory cells.

Example 7: The memory device of example 1, wherein a majority of photons of light directed into the array of flash memory cells have an energies that do not exceed five (5) eV.

Example 8: A memory device, comprising: an array of flash memory cells, the flash memory devices of the array each having at least a first charge holding layer and a first channel; and, a light source to illuminate the first charge holding layer and the first channel concurrently with a programming of the flash memory devices.

Example 9: The memory device of example 8, wherein illuminating the first charge holding layer and the first channel increases Fowler-Nordheim tunnel currents flowing between the first charge holding layer and the first channel.

Example 10: The memory device of example 8, wherein the light source comprises light emitting diode device.

Example 11: The memory device of example 8, wherein a programming voltage difference between a first control gate and the first channel while illuminating the first charge holding layer and the first channel concurrently with programming the flash memory devices is sufficient to program the flash memory devices without illuminating the first charge holding layer and the first channel.

Example 12: The memory device of example 8, wherein a first programming voltage difference that is used between a first control gate and the first channel to program the flash memory devices while illuminating the first charge holding layer and the first channel concurrently with programming of the flash memory devices is less than a second programming voltage difference that is sufficient to program the flash memory devices without illuminating the first charge holding layer and the first channel.

Example 13: The memory device of example 12, wherein using the first programming voltage difference while illuminating the first charge holding layer and the first channel concurrently with programming the flash memory devices reduces a power consumption used for programming when compared using the second programming voltage difference without illuminating the first charge holding layer and the first channel.

Example 14: The memory device of example 12, wherein using the first programming voltage difference while illuminating the first charge holding layer and the first channel concurrently with programming the flash memory devices reduces a power consumption used for programming when compared using the second programming voltage difference without illuminating the first charge holding layer and the first channel.

Example 15: A method of operating a flash memory device, comprising: illuminating a flash memory device array; and, concurrently with illuminating the flash memory device array, programming at least a portion of the flash memory device array.

Example 16: The method of example 15, comprising: not illuminating the flash memory device array concurrently with reading at least a portion of the flash memory device array.

Example 17: The method of example 16, further comprising: concurrently with illuminating the flash memory device array and programming at least a portion of the flash memory device array, using a programming voltage that is sufficient to program the flash memory device array without illuminating the flash memory device array.

Example 18: The method of example 16, further comprising: concurrently with illuminating the flash memory device array and programming at least a portion of the flash memory device array, using a first programming voltage that less than a second programming voltage that is sufficient to program the flash memory device array without illuminating the flash memory device array.

Example 19: The method of example 15, wherein the flash memory device array is illuminated using a light emitting diode.

Example 20: The method of example 19, wherein illuminating the flash memory device array further comprises: activating the light emitting diode to produce light that is concentrated in energy that is less than 3.5 eV; and, deactivating the light emitting diode.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory device, comprising:

an array of flash memory cells;

a light source to selectively direct light to illuminate the array of flash memory cells to enhance programming performance, the flash memory cells comprising a control gate, a charge holding layer, a tunnel insulator, and a substrate, the light comprising photons to strike electrons held by the charge holding layer, the photons striking the electrons held by the charge holding layer to have a photon energy that is less than the barrier height of the tunnel insulator; and control circuitry to apply a programming voltage to the control gate of at least one flash memory cell of the array of flash memory cells while the photons are striking the electrons held by the charge holding layer thereby, based on photon assisted tunneling of the electrons struck by the photons having the photon energy that is less than the barrier height of the tunnel insulator, increasing a Fowler-Nordheim tunnel current flowing between the charge holding layer and the substrate.

2. The memory device of claim 1, wherein the light source receives light to be directed into the array of flash memory cells from a source external to the memory device.

3. The memory device of claim 1, wherein the light source generates light.

4. The memory device of claim 1, wherein a programming performance is enhanced by a reduction of a programming time of flash cells of the array of flash memory cells.

5. The memory device of claim 1, wherein a programming performance is enhanced by increasing a number of programming cycles flash cells of the array of flash memory cells are to be reliably programmed.

6. The memory device of claim 1, wherein a programming performance is enhanced by decreasing an amount of power consumed during programming cycles of flash cells of the array of flash memory cells.

7. The memory device of claim 1, wherein the photon energy of the photons striking the electrons held by the charge holding layer is 2.7 eV.

8. A memory device, comprising:

an array of flash memory cells, the flash memory devices of the array each having at least a first charge holding layer, a first tunnel insulator layer, a first control gate, and a first channel; and, a light source to illuminate the first charge holding layer, the light comprising photons to strike electrons held by the charge holding layer, the photons striking the electrons held by the charge holding layer to have a photon energy that is less than the barrier height of the tunnel insulator, the photons striking the electrons held by the charge holding layer thereby, based on photon assisted tunneling of the electrons struck by the photons having the photon energy that is less than the barrier height of the tunnel insulator, increasing a Fowler-Nordheim tunnel current flowing between the charge holding layer and the substrate while a programming voltage is applied to the first control gate.

9. The memory device of claim 8, wherein the light source comprises light emitting diode device.

10. The memory device of claim 8, wherein the programming voltage is sufficient to program the flash memory devices without illuminating the first charge holding layer.

11. The memory device of claim 8, wherein the programming voltage is not sufficient to program the flash memory devices without illuminating the first charge holding layer.

12. A method of operating a flash memory device, comprising:

illuminating a flash memory device array with photons, the flash memory cells of the flash memory device array comprising a control gate, a charge holding layer, a tunnel insulator, and a substrate, the photons to strike electrons held by the charge holding layer, the photons striking the electrons held by the charge holding layer to have a photon energy that is less than the barrier height of the tunnel insulator;

concurrently with illuminating the flash memory device array, programming, using a first programming voltage, at least a first portion of the flash memory device array while the photons are striking the electrons held by the charge holding layer thereby, based on photon assisted tunneling of the electrons struck by the photons having the photon energy that is less than the barrier height of the tunnel insulator, increasing a Fowler-Nordheim tunnel current flowing between the charge holding layer and the substrate; and concurrently with illuminating the flash memory device array, programming, using a second programming voltage that has an opposite polarity to the first programming voltage, at least a second portion of the flash memory device array.

13. The method of claim 12, comprising:

not illuminating the flash memory device array concurrently with reading at least a third portion of the flash memory device array.

14. The method of claim 13, wherein the first programming voltage is sufficient to program the flash memory device array without illuminating the flash memory device array.

15. The method of claim 13, further comprising:

concurrently with illuminating the flash memory device array, using a third programming voltage that less than a fourth programming voltage that is sufficient to program the flash memory device array without illuminating the flash memory device array.

16. The method of claim 12, wherein the flash memory device array is illuminated using a light emitting diode.

17. The method of claim 16, wherein illuminating the flash memory device array further comprises:

activating the light emitting diode to produce photons with an energy of 2.7 eV; and, deactivating the light emitting diode.

* * * * *